United States Patent
Kim et al.

(10) Patent No.: US 9,414,205 B2
(45) Date of Patent: Aug. 9, 2016

(54) SYSTEM FOR PREEMPTIVE AND PROXIMATE ASSOCIATION IN INDUSTRIAL NETWORKS

(71) Applicant: Broadcom Corporation, Irvine, CA (US)

(72) Inventors: Yongbum Kim, Los Altos Hills, CA (US); Patricia Ann Thaler, Carmichael, CA (US); Yasantha Rajakarunanayake, San Ramon, CA (US); Michael David Johas Teener, Santa Cruz, CA (US); Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 14/502,411

(22) Filed: Sep. 30, 2014

(65) Prior Publication Data

US 2015/0094111 A1    Apr. 2, 2015

Related U.S. Application Data

(60) Provisional application No. 61/885,303, filed on Oct. 1, 2013, provisional application No. 61/976,600, filed on Apr. 8, 2014.

(51) Int. Cl.
*H04W 4/08* (2009.01)
*H04W 48/04* (2009.01)
*H04W 4/02* (2009.01)
*H04L 29/08* (2006.01)
*H04W 8/18* (2009.01)

(52) U.S. Cl.
CPC ............... *H04W 4/08* (2013.01); *H04L 67/14* (2013.01); *H04W 4/023* (2013.01); *H04L 67/322* (2013.01); *H04W 8/186* (2013.01)

(58) Field of Classification Search
CPC ............................. H04W 4/08; H04W 8/186
See application file for complete search history.

(56) References Cited

U.S. PATENT DOCUMENTS

| | | | | |
|---|---|---|---|---|
| 6,870,822 B2* | 3/2005 | Balogh | ............... | H04L 45/00 370/332 |
| 2015/0063312 A1* | 3/2015 | Vissa | ............... | H04W 36/26 370/332 |

* cited by examiner

Primary Examiner — Bobbak Safaipour
(74) Attorney, Agent, or Firm — Brinks Gilson & Lione

(57) ABSTRACT

A temporary work group system may include one or more network devices and one or more working devices. The network device can allocate an access point in a network to provide network access to a temporary work group. Working devices may be selectively identified by the network device as being available for inclusion in the temporary work group based on a first predetermined criteria that includes proximity to the access point and authentication of each of the working devices. Selectively identified working devices can be associated with the temporary work group based on a second predetermined criteria that includes a respective relative location of the working devices and respective functionality of the working devices. The system may preempt working devices from association with the work group session until such devices meet both the first predetermined criteria and the second predetermined criteria.

20 Claims, 4 Drawing Sheets

SYSTEM FOR PREEMPTIVE AND PROXIMATE ASSOCIATION IN INDUSTRIAL NETWORKS

PRIORITY CLAIM

This application claims the benefits of priority to U.S. provisional patent application Ser. No. 61/885,303, filed Oct. 1, 2013, and U.S. provisional patent application Ser. No. 61/976,600, filed Apr. 8, 2014, both of which are incorporated by reference in their entirety.

TECHNICAL FIELD

This disclosure relates to network communications, and more specifically to network group formation and management within an industrial network environment.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in managing communication on networks, including improvements in managing participants in a network, will further enhance performance of data networks.

DETAILED DESCRIPTION

The following discussion makes reference to industrial networks, and devices capable of communicating within industrial networks that can be selectively grouped in temporary work groups. Connectivity of the temporary work groups may be selectively provided based on intended use of the devices in order to minimize latency and improve robustness of wireline and/or wireless communication between the devices in the temporary work group by allocating a portion of the network, such as bandwidth and one or more access points, exclusively to the devices in the temporary work group. Devices not part of the temporary work group may be moved off of the portion of the network allocated to the temporary work group to free up network resources for exclusive use by only members of the temporary work group.

Membership in the temporary work groups may be dynamically adjusted by changing the connectivity of the devices. Initial formation and dynamic adjustment of the membership in the temporary work groups may be based on predetermined criteria such as proximity, credentials, geographic location of the devices, relative location of the devices, and/or functionality of the respective devices. Such temporary work groups may be established temporarily to fulfill a need during a work group session, and then disbanded. Devices that are associated in a temporary working group may also have sub-associations with other devices that can fulfill some or all of the predetermined criteria for membership in the temporary work group. Establishment of such temporary work groups may provide a highly reliable and secure communication environment in which devices may be associated and unassociated as needs change in order to leverage use of the devices in different activities while maintaining a secure, low latency communication environment.

In areas with industrial networks having many access points which are closely spaced geographically, such as in a medical facility where there could an access point and/or switch in each patient's room, formation of optimal sub-network control timing loop groupings may prove difficult. For example, in medical facilities such as hospitals, various types of equipment can be moved into and out of a patient's room dependent on conditions and treatment of the patient. Such equipment can interact with other equipment in the patient's room, as well as centrally located systems, often in control relationships. Accordingly, there could be several pieces of co-working equipment that are carted into a patient's room, where each piece of equipment may attach to different access points within the hospital, instead of converging on one or more access points offering, for example, the best timing support.

Figure 1:
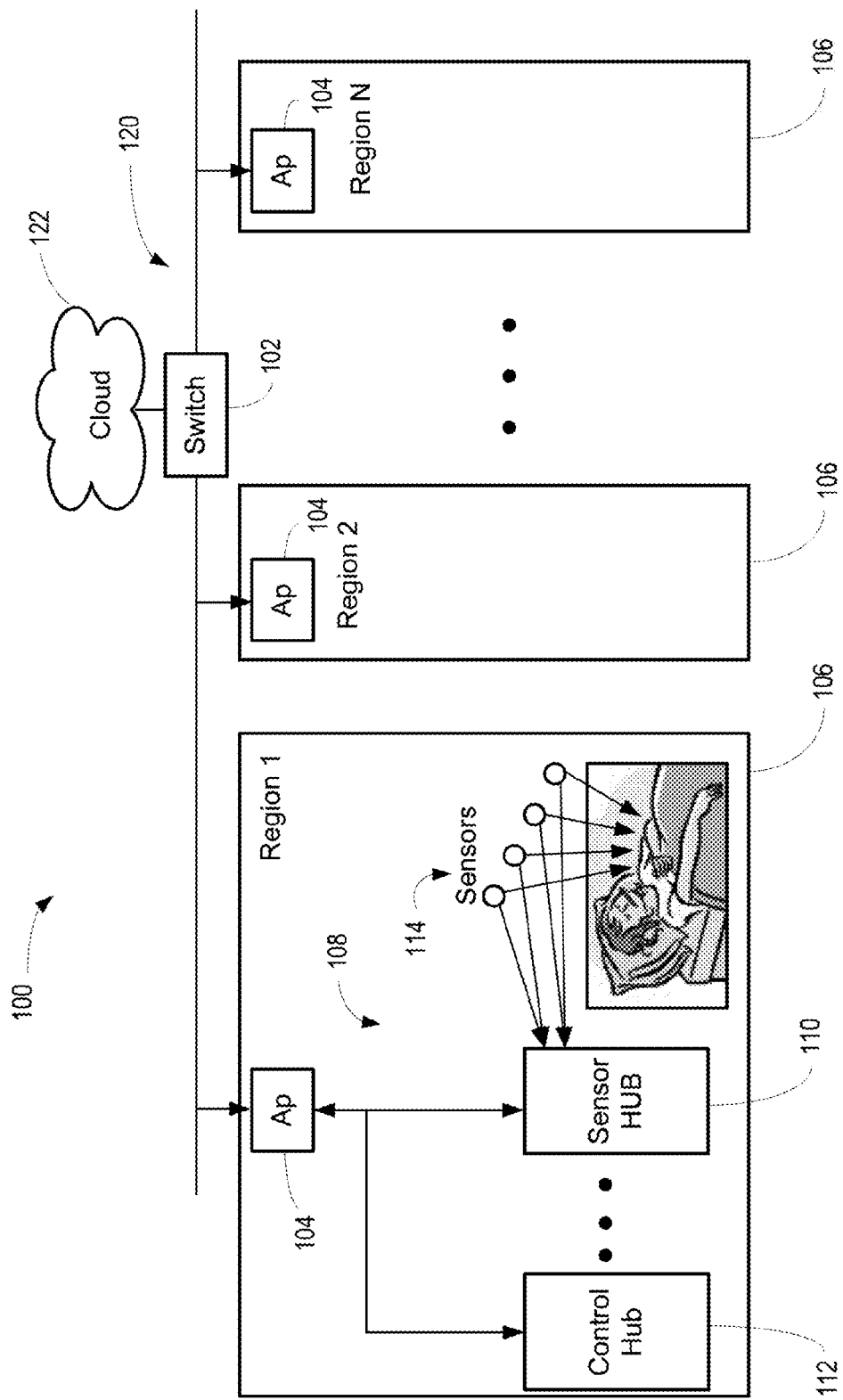
FIG. 1 shows an example of temporary work group system deployed in industrial networks.

FIG. 1 is an example temporary work group system 100 which includes a number of devices forming part of an industrial network. In FIG. 1, the system 100 is deployed in an example medical facility setting, however, in other examples the system 100 may be used in any other type of industrial network setting. The system 100 may include network devices such as one or more switches 102 in communication with any number of access points (AP) 104, which are dispersed throughout a geographic area, such as in patient rooms 106 in the example health care facility setting of FIG. 1.

The APs 104 may be in communication with one or more working devices 108, such as sensor hubs 110, control hubs 112, sensors 114 or other devices operating as members associated with a temporary work group. The sensors hubs 110 may be in communication with one or more sensors 114 forming a sub-association in the temporary work group.

One or more of the working devices 108 may be used in particular processes or activities, and may be temporarily associated in work groups during a corresponding work group session to complete particular processes or activities for which the temporary work group was formed. The temporary work groups may be associated with one or more APs 104 and each work group may be regionally established, such as within each of the patient rooms 106 in the health facility example of FIG. 1. Accordingly, each temporary work group may be organized around a topic or mission of the temporary work group. For example, in a health care facility setting, the mission, or topic of the temporary work group may be a patient ID, whereas in a manufacturing industrial network setting, the mission or topic of the temporary work group may be an identifier of a pre-determined configuration of machines that form a manufacturing process line.

The switches 102 and the APs 104 may be part of a network 120, which may provide access to other networks and/or devices, such as cloud based resources 122 with an industrial network. Accordingly, the working devices 108, such as sensor hub 110 and the sensors 114, and/or control hubs 112 that are associated in a temporary work group may communicate with each other over the network 120, as well as communicate with other networks and/or devices, including the cloud based resources 122.

The network 120 may include the Internet, a public and/or private intranet(s), an extranet(s), a dedicated communication line(s) and/or any other communication configuration to enable transfer of data and commands. Communication within the network 120 may be performed with a communication medium that includes wireline based communication systems and/or wireless based communication systems. The communication medium may be, for example, a communication channel, radio waves, microwave, wire transmissions, fiber optic transmissions, or any other communication medium capable of transmitting data, audio and/or video information. The network 120 may communicate with a predetermined protocol such as an Ethernet network using TC/PIP. In other examples, any other network based communication protocol may be used. Although not illustrated, included within the network 120 may be any number of passive interconnects, intermediate networking devices, control element nodes, and any other devices used to provide functionality of the control network.

The working devices 108 may be equipment capable of communication with other equipment, such as over the network 120. Examples of working devices 108 are the sensor hub 110 which can perform monitoring and/or control and may communicate and manage one or more sensors 114, and the control hub 108, which can control one or more actuators, or other working devices 108. In an example, a control hub 108 can control a mix of sensors and actuators. In other examples, other input devices such as interface devices for human input, such as a key pad, a switch, as well as output devices such as a numeric display, a video display or an alarm, can be included among the working devices 108. In still other examples, other types of working devices 108 may be included in a temporary work group.

In the example of FIG. 1, working devices 108 such as the sensor hub 110, control hubs 112 and sensors 114 can go through a two-phase process to gain access to the temporary work group. In a first phase, the devices may be authenticated, and identified as eligible to join the temporary work group based on proximity. Authentication may involve confirming the identity of each of the working devices using, for example, a unique identifier (ID). Determination of proximity eligibility may be based on geographic proximity to one or more of the APs 104 under which the temporary work group is formed.

Figure 2:
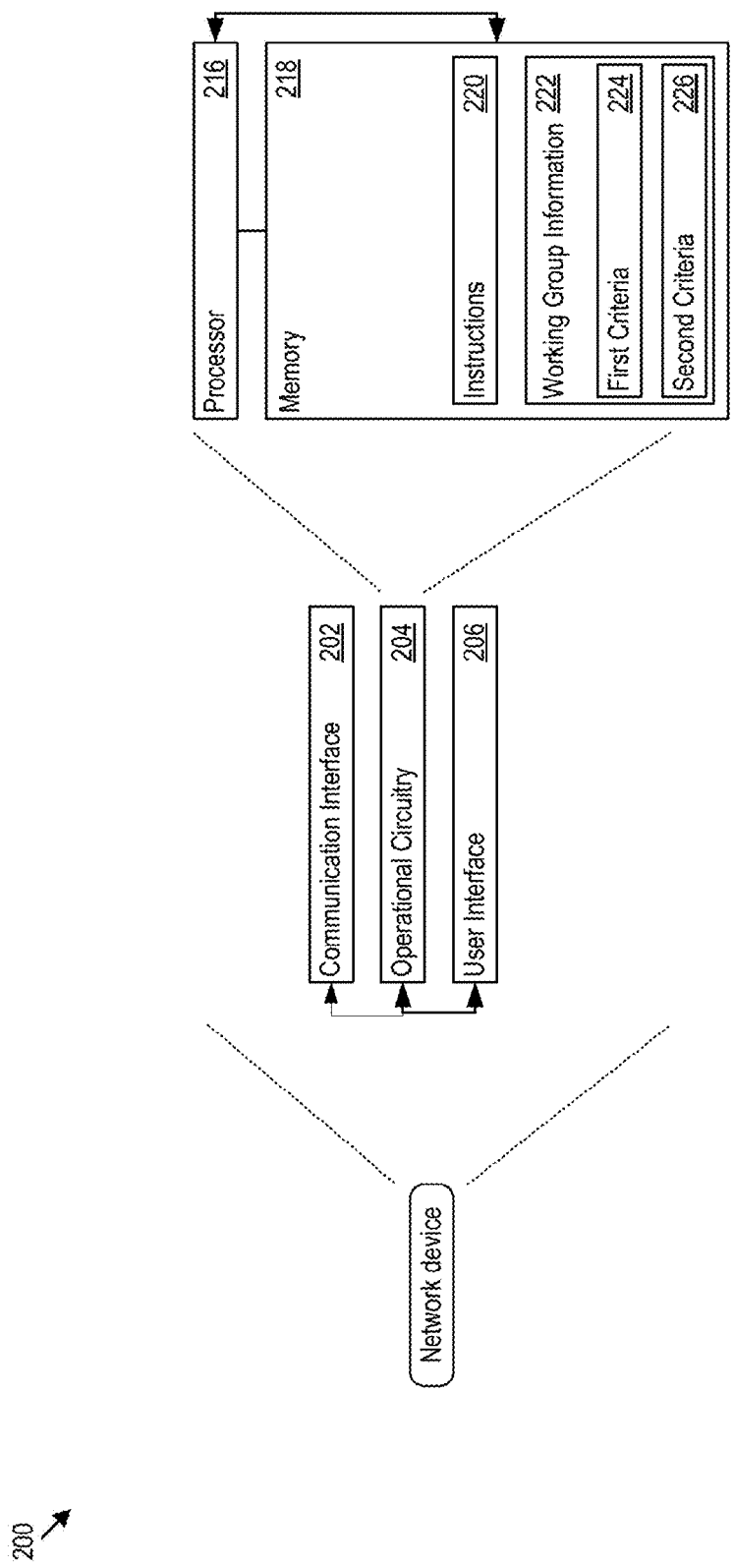
FIG. 2 is a block diagram of an example of a network device included in the system of FIG. 1.

FIG. 2 is a block diagram of an example network device 200. The network device 200 can include the switch 102, and/or the access point 104. Circuitry of the network device 200 may include communication interface circuitry 202, operational circuitry 204 and a user interface 206. The communication interface circuitry 202 may include one or more communication ports, such as Ethernet ports, or any other type of wired or wireless communication interface. The communication interface circuitry 202 can receive or transmit packets that include data and system information. For example, network device 200 can transmit a multicast discovery frame to initiate discovery or receive a multicast discovery frame via the communication interface circuitry 202. As discussed later, a multicast discovery frame may be transmitted by the network device 200 to get other network devices in range of the network device 200 to respond so the network device 200 can begin the process of finding other network devices that are members of the network device's group. The network device 202 may also transmit or receive packets to manage a group of network devices. These packets may be generated by the devices in the network 120, such as medical equipment, server computers, access points, switches, and/or any other devices on the network 120. The packets may also be packets that were already part of the traffic flow in the network 120, but to which a device on the network 120 has added annotation information, such as network conditions. In addition, the communication interface circuitry 202 provides a communication interface that can include any mechanism or device providing one or two-way communication with other devices, such as a laptop or tablet. Thus, communication ports included in the communication interface circuitry 202 may also include input/output capability such as analog and digital signal capability, as well as signal conversion capability such as analog-to-digital, digital-to-analog, scaling, frequency, or any other conversion technique. The communication ports included in the communication interface circuitry 202 may also include communication capability in other protocols, such as RS232, RS422, USB™, Firewire™, Bluetooth™, ring bus, proprietary protocols, and/or any other communication protocol, as well as protocol conversion capabilities to convert from one protocol to another.

The operational circuitry 204 is implemented in hardware, and may include software. In one implementation, the operational circuitry 204 includes circuitry such as one or more processors 216 and memory 218. The memory 218 may store instructions 220 (such as program instructions) for execution by the processor 216. Such instructions may include operational information/instructions/data to support the functionality of the network device 200 described herein. The memory 218 may also hold working group information 222, such as parameters of a first predetermined criteria 224 and a second predetermined criteria 226. The working group information 222 may be used in formation of a temporary work group. For example, the first predetermined criteria 224 may be used during selective identification of devices in communication with the network device 200 as being available for inclusion in the temporary work group, and the second predetermined criteria 226 may be used during association of selected devices with the temporary work group. The first and second predetermined criteria 224 and 226 may also include other criteria for inclusion in the temporary work group.

The user interface 206 may provide, for example, buttons, indicators lights and other such user operated devices and mechanisms capable of providing signals to the network device 200 when actuated by a user. In addition, the user interface 206 may provide for remote or local generation and/or population of a graphical user interface that allows for setup and maintenance of the network device 200, which can include authorization of devices for inclusion in the temporary work group. In an example embodiment, such authorization of devices may involve use of credentials for authentication and security related features. In addition, network device and/or network related operational information such as latency in communication, signal strength and other performance based criteria can be managed via the user interface 206.

During operation, with reference to FIGS. 1 and 2, the network device 200 may include or manage one of more access points 104 within the network 120. Accordingly, the network device 200 may employ any of several approaches to manage a local AP 104 to provide intelligent selection and control of a temporary work group. For example, in a medical facility setting, the network device 200 may identify various medical devices as being available for inclusion in a temporary work group based on parameters within the first predetermined criteria 224 such as proximity of the devices to an access point and authentication of devices.

Proximity of the devices may be based on signal strength, communication latency (such as number of network hops) or other criteria that establishes a robustness or integrity of the communication connection between the AP 104 and the devices to meet or exceed predetermined operational performance levels such as minimum data throughput levels and minimum connection reliability standards. In addition, or alternatively, proximity eligibility may be based on, geographic coordinates such as from a global positioning system (GPS), or any other geographic location determination to identify if the working devices 108 will have sufficient communication connectivity to meet the needs of the temporary work group.

Authentication of the devices may involve confirming the identity of the devices using device credentials or other mechanisms for verification that only authorized devices are identified as available for inclusion in the work group. Such device credentials can be a unique device identifier, such as a MAC (media access control) address, a token, authenticity certificates, and/or a uniquely assigned identifier that is stored and available for lookup by the network device 200. In addition, authentication may involve passwords, encrypted keys, and/or any other mechanism for confirming the identity of the devices.

Once the devices are identified as working devices 108 which are eligible for inclusion in the temporary work group based on the first predetermined criteria, the network device 200 may associate selected ones of the working devices 108 with the temporary work group based on the second predetermined criteria 226. Selection of eligible working devices 108 using the second predetermined criteria may include determination of a relational region. The relational region determination may be based on a relative location of devices to each other and/or to the AP 104, and/or to any other point of reference having a unique identifier. The relative location may be a location in three dimensional space, which may be determined without reference to a physical geographic location. For example, in the medical facility setting, the point of reference may be a bed in which a patient resides which includes a unique identifier provided with an RFID chip, or a unique identifier associated with the patient, such as a bracelet worn by the patient having an RFID chip transmitting the unique identifier. Accordingly, in this example, the reference point is capable of movement. In other industrial network settings, such as in a manufacturing process, one or more unique IDs associated with different re-configurable manufacturing equipment may be recognized due to the physical configuration of the manufacturing equipment in a process line.

Accordingly, the network device 200 may establish the relative location of the different identified devices by comparing geo-locations of the different devices. Establishment of geo-locations may be based on relative signal strength, triangulation among devices, radio frequency identification (RFID), Bluetooth™, or any other functionality to position different devices in three-dimensional (3D) space (such as a longitude, a latitude and a height above sea level). Based on the established geo-locations of the devices, relative location of devices can be discovered by comparison of their respective geo-locations, or by comparison of some other measurement, such as distance between devices, that is not reliant on where a device is physically or geographically located, but is instead focused on relative position of devices with respect to each other. Accordingly, in the example of FIG. 1, for example, the discovered relative location of the medical devices may be used in connection with the second predetermined criteria to relatively locate those medical devices that are likely to be physically located in the same examination room. As a result of establishment of the relative location of different medical devices, those medical devices included in the temporary work group can be location and neighbor aware.

Selection of some of the eligible devices for association with the temporary work group using the second predetermined criteria may also be based on the functionality of each respective device. Thus, the network device 200 may also determine the functionality of each one of the identified working devices 108. Determination of the functionality of a working device 108 may be based on stored information associated with the unique ID of a respective device, such as a look up table or database. In addition, or alternatively, determination of functionality may be based on queries of the respective device, and/or information supplied by the respective device. Alternatively, or in addition, a predetermined list of working devices 108 may be used to determine/confirm that a device includes functionality that is desired to be associated with the temporary work group. For example, in the case of a medical procedure such as a cardiac operation, a list of medical devices may be pre-identified as being needed for such a procedure. Accordingly, those working devices 108 that are included in the list may be associated with the temporary work group. In another example, the network device 200 may determine the functionality of a particular medical device by confirming that the particular medical device is identified in the list, such as by a unique ID, as being needed for the medical procedure.

Devices meeting the first and second predetermined criteria may be associated with the temporary work group by the network device 200. Those working devices 108 associated with the temporary work group may be attached to the allocated access point(s) 104 using a predetermined protocol to form a work group session. The predetermined protocol may be used to create a secure communication channel, such as a secure socket layer (SSL) channel, or any other transport layer security for communication between the devices and/or the AP 104.

Association of the working devices 108 may also involve configuration of the devices to operate within the temporary work group. Such operational configuration may involve establishing secure communications, redundant communications (such as wireless and wired communication), multiple communication protocols for communication among different devices, and/or protocol translation. In addition, data output and data input arrangements may be established, such as types of data, frequency of transmittal/receipt, units, or any other data related parameters. For example, configuration of communication protocols or other functionality may be performed, which may include configuration of circuitry such as a field programmable gate array (FPGA) within the working devices 108 to operate within the temporary work group.

Also, the functionality of the working devices 108 may be selectively and dynamically modified, added and/or changed so that the working devices 108 cooperatively function within the temporary work group. For example, a first device associated with the temporary work group may be configured to use data generated by the other devices within the work group session. Accordingly, as a result of association with the temporary work group different devices may communicate among themselves in cooperative operation. Thus, in an example of cooperatively operating medical devices, a medical device providing pain or anesthesia medication to a patient involved in a surgery may use an echo cardiogram (EKG) provided by another medical device to adjust the level of pain medication or anesthesia medication being administered to the patient in response to changes in an EKG reading.

The network device 200 may allocate at least one AP 104 to provide network access for the temporary work group. Access point allocation may be based on user specified criteria, the expected number of working devices 108 to be included in the temporary work group, and/or the expected proximate location of the devices to be included in the temporary work group. Allocation may also be communication frequency based in order to reserve and maintain a predetermined range of frequency spectrum for use by only the working devices 108 that are associated with the temporary work group. During or upon establishment of the work group session, any devices in the predetermined range of frequency reserved for the temporary work group that are not associated with the temporary work group may be moved to other ranges of frequency. Thus, certain frequency ranges may be cleared of devices that are not part of temporary work group even when those devices meet some but not all of the first and second predetermined criteria. Accordingly, devices that, for example, meet the first predetermined criteria by having been authenticated and confirmed as located geographically proximate may be preempted from communication within the range of frequency allocated for the temporary work group. In another example, devices that meet not only the first predetermined criteria, but also the relative location criteria of the second predetermined criteria may be preempted because the functionality of the devices does not meet the criteria for functionality provided in the second predetermined criteria.

For example, in a medical facility setting, if a patient room contains three medical devices providing EKG functionality, all three of the devices could meet the first and second predetermined criteria yet only one device may be associated with the temporary work group and allowed to communicate in the predetermined frequency range, while the other two medical devices may be moved to other frequency ranges and preempted from communication in the predetermined frequency range. In this example, the functionality criteria of the second predetermined criteria may identify the unique ID of only one of the three medical devices. Alternatively, the functionality criteria of the second predetermined criteria may provide that only one of the three devices with the indicated functionality is needed in the temporary work group, so that only one of the devices may be selected for association with the temporary work group. Selection of among the three devices may be based on other criteria within the first or second predetermined criteria, such as signal strength or a relative location, respectively. In this example, the network device 200 may identify one of the other devices capable of providing redundant functionality as a backup device, which could be later dynamically associated with the temporary work group in the event that criteria, such as the relative location of the associated redundant device within the temporary work group, changes to be less desirable than the backup device.

In other examples, at least part of the functionality of the network device 200 may be included in other devices, such as the switch 102 or the cloud based resources 122. In addition, processing, such as analysis and formulation of results from data collected, or authentication related processes may be performed external to the network device 200. Also, data storage, such as in the a health facility setting where storage of patient specific information, such as health records, occurs may be stored securely in the cloud based resources 122 to comply with health privacy related requirements for patient data.

Although the network device 200 may provide management and control of the temporary work group, each of the working devices 108 associated with the temporary work group may work autonomously or cooperatively within the work group session without direction or control from the network device 200. Alternatively, or in addition, direction/control may be provided to the working devices 108 by the network device 200. In addition, working devices 108 may be prearranged to communicate with other devices associated with the temporary work group, such as other devices which are sub-associated with one or more working devices 108 by being commonly manufactured with the one or more working devices 108, thereby automatically meeting at least the authentication portion of the first predetermined criteria without confirmation under the first predetermined criteria.

For example, in FIG. 1, the sensor hub 110 may operate as a working device 108 associated with a temporary work group, which is also in wireless or wireline communication with one or more other working devices 108, such as sensors 114 which are also associated with the temporary work group. Alternatively, the sensor hub 110 may be associated with the temporary work group, and working devices such as the sensors 114 in communication with the sensor hub 110 may be not separately associated with the temporary work group. Instead, the sensors 114 may be in a sub-association with the sensor hub 110, where the sensor hub 110 has performed authentication and established communication, such as secure communication, with the sensors 114. Thus, in an example where only the sensor hub 110 is associated with the temporary work group, the working devices such as sensors 114 may communicate in a sub-association only with the sensor hub 110, and not communicate within the frequency range of the temporary work group. Accordingly, the sensor hub 110 and the sensors 114 of this example may perform independent authentication, proximity, geo-location, relative location, and configuration using independent communication channels and protocols, for example. In an example of a medical facility scenario, the working device 108 may be a sensor hub 110 operable as an EKG machine that included wireless heart sensors provided by the manufacturer of the EKG machine, which communicate only with that particular EKG machine using a manufacturer's authentication and communication protocol. In an alternative example, the sensor hub 110 and sub-associated working devices such as sensors 114 may both be associated with the temporary work group after meeting the first and second predetermined criteria. In other examples, due to the sub-association, the sensors 114 may be associated with the temporary work group based on the sub-associated working device 108 meeting the first and second predetermined criteria and being associated with the temporary working group, without a separate determination that the sensors 114 independently meet the first and second predetermined criteria.

Figure 3:
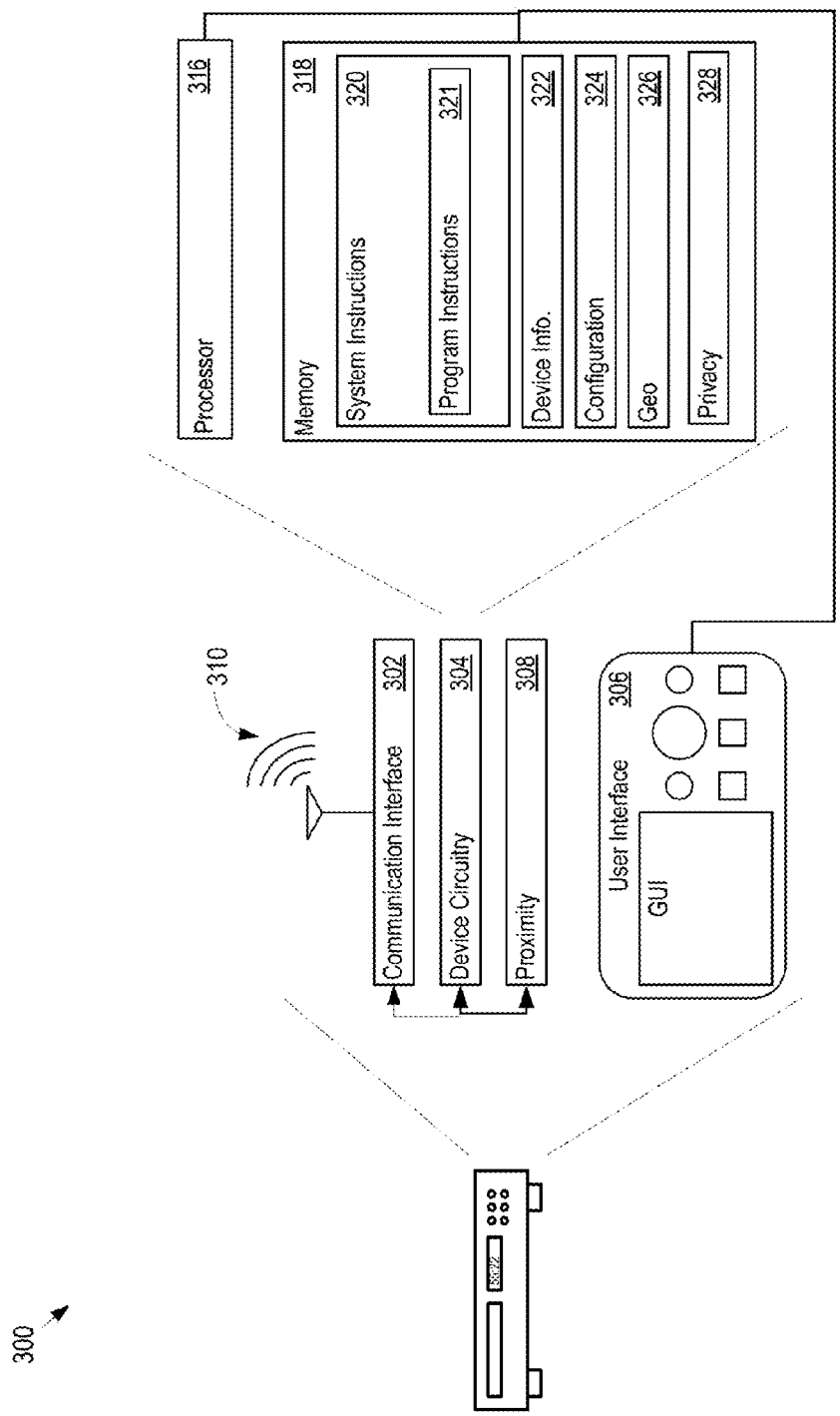
FIG. 3 is a block diagram of a working device included in the system of FIG. 1.

FIG. 3 is a block diagram of an example working device 300, such as a sensor hub 110, or a control hub 112 that can meet the first and second predetermined criteria, and can be associated with a temporary work group. In FIG. 3, the working device 300 may include circuitry that includes communication interface circuitry 302, device circuitry 304, user interface circuitry 306, proximity circuitry 308, and optionally can include antenna circuitry 310 used for wireless communication.

The communication interface circuitry 302 may include one or more communication ports, having similar functionality to the communication ports described with reference to the network device 200 of FIG. 2. Accordingly, for purposes of brevity, repetition of discussion will be avoided. The communication interface circuitry 202 may communicate with one or more other working devices, such as the control hub 112, and/or the sensors 114. The sensors 114 may communicate with the working device 300 over a secure communication channel, such as an encrypted channel. In example embodiments related to the medical facility, the working device 300 may communicate with sensors 114 such as an EKG sensor, a blood pressure sensor, an oxygen level sensor, a temperature sensor, or any other sensor related to patient care and monitoring.

In an embodiment, establishment of communication over the network between the working device 300 and other working devices, such as the sensors 114, may be dynamic and automatic by association of the working device 300 and other working devices within the same temporary work group. For example, the working device 300 and other working devices may be communicatively coupled with an access point 104 allocated to provide network access to the temporary work group.

In another embodiment, the working device 300 may establish independent sub-associations used for communication with other working devices in the temporary work group, such as via BlueTooth™, or establishment of a piconet, for example, in order to associate the other devices with the temporary work group. In this embodiment, the working device 300 may include functionality similar to the previously discussed network device 200 in order to confirm that the other device(s) meet the first predetermined criteria and the second predetermined criteria for association with the temporary work group.

Alternatively, or in addition, some of the working devices may have previous confirmation of meeting some or all of the first and second predetermined criteria, such as proximity and authentication. For example, in a medical facility example, a working device 300 which is medical device operating as an EKG device may have other devices, such as heart sensors, which are sub-associated or linked with the EKG device as part of the manufacturing or startup/initiation/installation process. Accordingly, once the EKG device of this example meets the first predetermined criteria and the second predetermined criteria, the EKG device may be associated with the temporary work group, along with the sub-association of the heart sensors, which collaterally meet the first and second predetermined criteria due to being linked with the EKG device. In an example embodiment, once a working device 108 and sub-associated linked devices are associated with the temporary work group, either the working device, or the sub-associated linked devices may be dynamically configured during the temporary work group association process to be available to other working devices in the temporary work group. Accordingly, returning to the example of an EKG device, the heart sensors linked with the EKG device may be accessed over the network or via the EKG device, and sensor information from such linked devices can be used directly by other working devices 108, such as a blood pressure device.

The device circuitry 304 is implemented in hardware, and may include some software. The device circuitry 304 may, in general, provide the functionality of the working device 300 as described. Such functionality may involve network communication based functionality, device specific functionality, and peer-to-peer communication functionality. The device circuitry 304 may include circuitry such as one or more processors 316 and memory 318. The memory 318 may store instructions 320 (such as program instructions 321) for execution by the processor 316. Such instructions may include operational information/instructions/data to support the functionality of the circuitry of the working device 300 described herein.

The memory 318 may also hold device information 322, such as a unique ID of the working device 300 and/or information related to functionality of the working device 300. In addition, the device information 322 may be used in conjunction with generation, storage and/or use of authentication information such as tokens, security certificates, public and/or private encryption keys, and other credentials used to authenticate the working device 300 and/or other devices. Also, linking information related to other working devices, such as sensors 114, which are linked by sub-association with working device 108 may be stored within the device information 322. Such linking information may be used by the circuitry of the working device 300 to establish a secure communication link with such linked devices.

Further, the device information 322 may be used by the circuitry of the working device 300 to provide for the functionality of the device, for example, an EKG device may identify itself as for patient heart monitoring with the device information. The memory 318 may also include configuration information 324, which may be populated by the device circuitry 304 at the time the working device 300 is associated with a temporary work group. The configuration information 324 may also include control configuration information for operation of the working device 300 within the temporary work group. Such control configuration information may also be configurable at the time of association of the working device 300 with the temporary working group.

The user interface 306 may provide, for example, buttons, indicators lights, a graphical user interface (GUI) and/or other such user operated devices and mechanisms capable of providing indications to the user, and signals to the working device 300 when actuated by a user. In addition, the user interface 306, may include visual and/or audible indication via the user interface 306 that alert a user that the working device 300 has been associated with a temporary work group and is ready to function within that temporary work group. Thus, in the example of a medical facility, all the equipment necessary for a patient procedure may be associated in a temporary work group, and indicators on each of the devices may indicate successful association and configuration for operation in the temporary work group to complete the particular procedure. In this example, each device involved in the patient procedure may include a visual indicator, such as an illuminated light indication to represent the working device 300 is ready for operation in the temporary work group.

The proximity circuitry 308 may include proximity determination capability, such as geographic location functionality using a global positioning system (GPS) transceiver to identify a geographic position of the working device 300. In addition, or alternatively, the proximity circuitry 308 may include geo-location functionality to determine the relative position of the working device 300 with respect to other objects, such as another device. Accordingly, the memory 318 may include a geo component 326 that can store geographic location related information, such as a map database. In addition, or alternatively, the geo component 326 may include geo-location information that can be indicative of relative position of the working device 300 with respect to surrounding devices and other objects obtained by the working device 300. The geo component 326 may also include or store any other information related to proximity, such as a geographic location, a geo-location, and/or a relative location of the working device 300.

Some of all of previously discussed functionality of the network device 200 may also be included in the working device 300. Accordingly, in example embodiments, working group information 222, the first predetermined criteria 224 and the second predetermined criteria 226, as discussed with reference to FIG. 2, may be included in the memory 318. Alternatively, or in addition, some or all of the functionality of the working device 300 may be included in the network device 200.

The working device 300 may also include in the memory 318 a privacy component 328. In the example of a medical facility setting, a patient's health data may be securely stored in the privacy component 328. In an embodiment, the privacy component may require additional authentication, such as a password, a certificate, or a token to allow user access.

Referring to FIGS. 1-3, as previously discussed, the system 100 may employ any of several approaches in which a network device 200, such as a local AP 104, having proximity to one or more working devices 300 can be used to dynamically select devices for development of one or more temporary work groups. As part of these approaches, the system may, for example, apply preemptive wireless AP associations in which association of devices may be blocked or accepted based upon the first predetermined criteria which includes proximity and authentication, and the second predetermined criteria which includes relative location and functionality of the working device 300. In addition, the system may provide dynamic and automatic control association and/or data association among working devices 108 associated with the temporary work group and/or devices sub-associated with working devices 108.

For example, in the context of a medical facility, many on body sensors may be automatically paired in an association or a sub-association with a bed-side heart pacing machine based on geo location (relative location) of the body sensors and the heart pacing machine. Since the geo-location of devices may be 3D locations used to determine relative locations, critical communications and corresponding association of devices in temporary control groups can be managed via a select proximate network device 200, such as an AP 104, while other devices 300 not the temporary work group may be redirected to other AP's 104. In other words, in the present system, signal strength alone is not the primary consideration in industrial and medical settings for attachment to available network devices, such as APs 104.

Due to the selective association of devices within a temporary work group, inter-work group interactions can be performed with minimal latency, and communication within the band of frequencies allocated to the temporary work group may be mostly free from unrelated communication flow, which can positively influence performance during cooperative operation of the devices 300 within the temporary work group. In the example of a medical facility, use of temporary work group avoids a situation where a control loop or other critical timing pathway between one or more in room medical devices and a series of on-patient sensors flows through a number of neighboring APs and backbone hops before interacting with each other. The system is not limited to use in medical facilities, and use in any other industrial or commercial context are contemplated. For example the formation of temporary work groups using the first and second predetermined criteria may be used to restrict neighboring interaction attempts in a multi-family dwelling or coffee shop hotspot type installations. For example, use of the a temporary work group may allow for a customer only access to a coffee shop network for only those customers with devices who meet the first and second predetermined criteria to an otherwise open (no password required) network access. The formation and use of temporary work groups may also, for example, allow for thwarting repeated password hacking attempts in multi-family dwellings.

Temporary work groups may be used in situations such as a health care facility or a flexible manufacturing environment in which the first predetermined criteria, which includes proximity and the second predetermined criteria which includes relative location may be used to restrict networking and control relationships. For example, in a multi-room health care facility such as a hospital, wireless and wired linkages could be established for many control and controlled devices spanning many rooms. Depending on the flexible positioning of such devices, such as carting equipment into a particular patient's room, control and communication relationship decisions could be addressed by association of the devices with a temporary work group.

For example, using a temporary work group, a desire to restrict wireless access to a particular room and/or floor may be carried out. In addition, although wired linkages may indicate proximity, particular arrangements of equipment may be recognized by the system during association of devices with a temporary work group, and the devices may be dynamically configured by the system with more robust communication connections, such as configuring particular devices within a temporary work group with both a wired and a wireless communication path, or communication paths through multiple APs 104. In the example of a medical facility, devices that are "mission critical" to a particular patient procedure may be configured in a temporary work group with redundant communication paths and/or redundant devices with interaction by medical staff. In example embodiments, such redundancies and other mechanisms to create "fail safe" operation may be automatically and dynamically established as part of association with a temporary work group when a device is identified as being "mission critical." Whereas in other example embodiments, a user may be prompted to add secondary wired linkages and to other devices and/or network nodes within the temporary work group to create redundant communication paths and/or functionality among the devices in the temporary work group. In still other embodiments, the equipment/devices themselves may have inherent requirements for both wireless and wired access and overall network path requirements including performance and reliability which are provided to the temporary work group as part of the association process. Thus, in an example of a medical facility, by carting yet another piece of equipment into a room such that the device meets the first and second criteria for being a working device associated with a temporary work group, an entirely different network access and end to end pathway for carrying out communication and/or control can dynamically and automatically take place.

Temporary work groups can be regionally instituted. Each of these regional configurations, such as a room based region, may have communication pathways and performance that are based on accurate location information (both proximity and relative location) of underlying elements. Beyond restricting/reconfiguring wireless access, use of the temporary work groups can extend to not allowing devices, such as machine to operate, or selectively permit/deny operating modes for devices based on proximity and relative location of that device/machine.

In an example where two pieces of nearby equipment, such as medical devices, may be for different uses, such as for two different patients, the two pieces of equipment may be associated with two different temporary work groups so that the two pieces of equipment can be on different networks, frequency bands, protocols, or other conditions, such as to avoid interference, guarantee bandwidth, provide reduced latency and/or fulfill other desired operational characteristics for cooperative operation of the devices. In addition to permitting functionality of the devices based on membership in a temporary work group, devices may be configured as part of the association process to, for example, cooperatively operate with other devices in the temporary work group.

The devices 300 included in a temporary work group may be configured as part of the association process to cooperatively operate to share data over the network with other members associated in the temporary work group. In addition, network devices 200, such as switches 102 can inspect data, such as packets transmitted over the network 120 to find metadata and find location/time information added by any devices/nodes in the temporary work group. By using such watermarking, network devices 200 such as switches 112 can monitor for communication in the temporary work group which exceeds latency thresholds and change the membership of a temporary work group accordingly. In addition, devices in a temporary work group who are actively communicating over the network may be monitored for replacement when, for example, the first and second predetermined criteria is no longer met, whereas devices that are not actively communicating, such as because they are no longer being used, may be dis-associated from the temporary work group without being replaced.

Rearrangement of a previously formed temporary work group may be dynamically performed in response to predetermined events. For example, a previously associated working device 300 may be automatically disassociated and replaced with a newly added working device 300 when the previously associated working device 300 no longer meets the first and second predetermined criteria, and the newly added working device 300 does. In another example, the previously associated working device 300 may be disassociated and replaced with a newly added working device 300 when both working devices 300 still meet the first and second predetermined criteria, however, the newly added working device 300 is determined to better meet the predetermined first and second criteria than the previously associated working device 300. In the context of a medical facility, medical devices may be associated and disassociated based on, for example, the geo-location of the devices relative to the position of a patient. Also, association of devices in temporary work groups may be based on predetermined parameters triggering the initiation of the association process. For example, different devices, such as sensors, may be associated and disassociated from different temporary work groups at different times of the day to move from one task (control group) and later to another.

Temporary work groups may also be dissolved at the conclusion of the specific mission, topic or matter for which the temporary work group was formed. Accordingly, temporary work groups may be dissolved in response to a predetermined event, such as completion of a medical procedure or re-location of corresponding equipment. Alternatively, or in addition, temporary work groups may be dissolved in response to a user initiated command, or due to a period of inactivity, such as a predetermined period of inactivity of communication traffic on the frequency band allocated to a temporary work group. Dissolution of a temporary work group may include individually disassociating the working devices 300 from the temporary work group. In addition, a reservation of bandwidth, and or network devices 200 may be removed to allow the bandwidth and/or network devices to be available for uses other than those related to the temporary work group.

Figure 4:
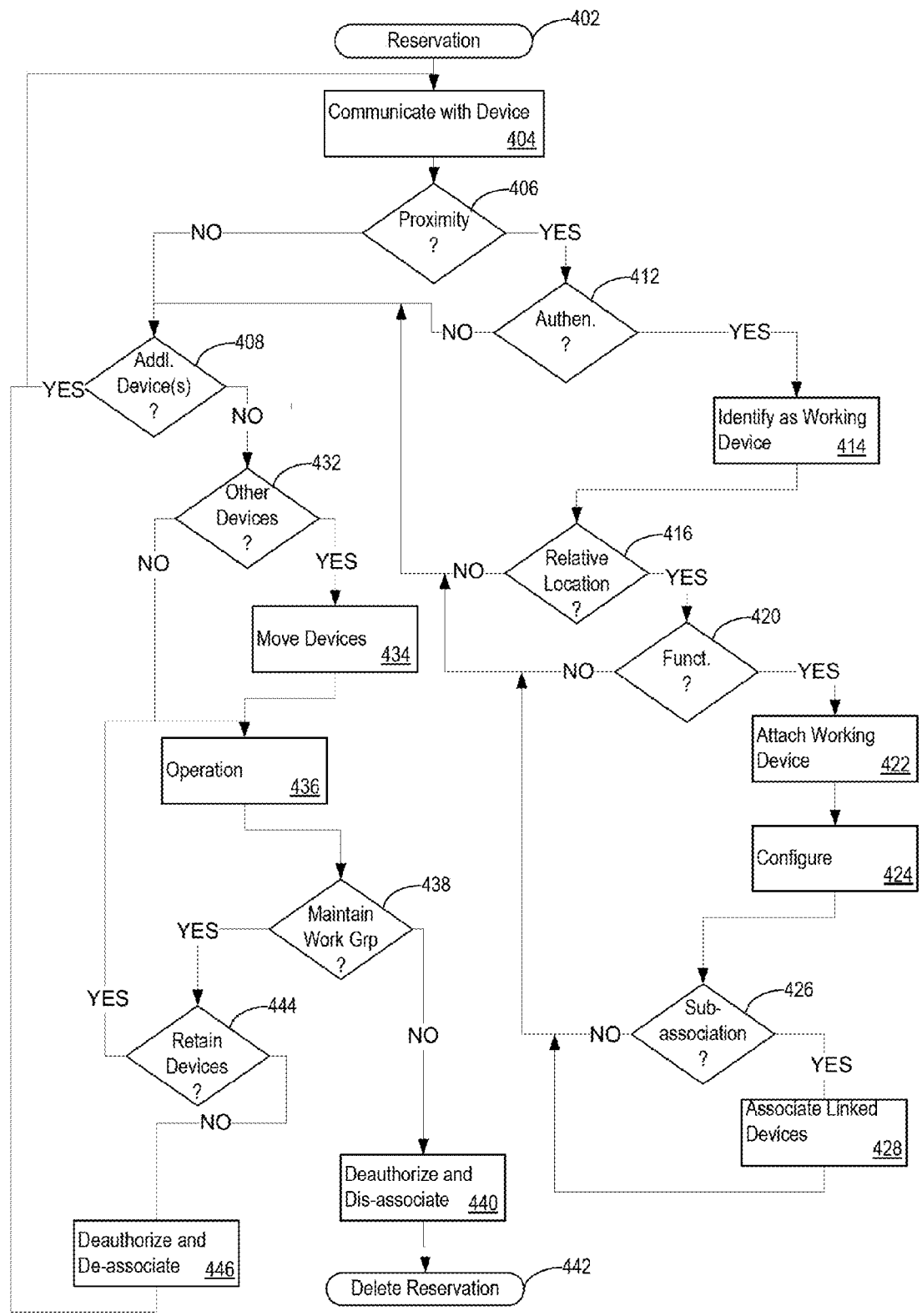
FIG. 4 is an example operational flow diagram illustrating operation of the temporary work group system.

FIG. 4 is a flow chart illustrating example operation of the temporary work group system 100 with reference to FIGS. 1-3. In block 402, a portion of the system may be exclusively reserved for a particular activity, mission or topic, by allocating a network device 200, such as an AP 104, to provide network access for a temporary work group. The reservation may include allocation of communication bandwidth exclusively for only those working devices who are members of the temporary work group by reserving a range of frequency spectrum. For example, a temporary work group may be identified for a regional area that is a patient's room in a medical facility such as a hospital for operation in a range of frequency spectrum allocated to the temporary work group. In addition, in some embodiments, the capability of the access point to provide communication below a predetermined latency threshold of the temporary work group may be confirmed as part of the allocation process.

At block 404, the network device 200 may communicate with a device either wirelessly or by wireline, or both and apply a first predetermined criteria to the device to determine if the device is available for inclusion in the temporary work group. The network device 200 may determine if the device is in a predetermined geographic proximity of the AP 104 as one of the first predetermined criteria at block 406. The predetermined geographic proximity may be based on signal strength, GPS coordinates, communication latency being below a predetermined criteria, or any other analysis to determine geographic location proximity. If the device is not within the predetermined geographic location proximity, the network device 200 may cease communication with the device and seek to communicate with additional devices at block 408. If there are additional devices with which to communicate at block 408 and working devices are needed for the temporary work group, the operation may return to block 404, and if there are no additional devices needed in the temporary work group, the operation proceeds as discussed later.

If, at block 406 it is determined that the proximity of the device meets the first predetermined criteria, the network device 200 may authenticate the device as another of the first predetermined criteria at block 412. If the device cannot be authenticated, the device fails to meet the first predetermined criteria, and the operation returns to block 408. If the device can be authenticated, the device is identified as one of a number of working devices that are available for inclusion in the temporary work group at block 414 since it meets the first predetermined criteria of this example operation. In other examples of operation, additional criteria, as previously discussed may be included in the first predetermined criteria.

At block 416, a geo-location of the identified device, for example, can be used to determine a relative location of the identified device as part of a second predetermined criteria for association with the temporary work group. The relative location may be determined based on a relative 3D location of the identified device with respect to a reference, such as a bed of a patient, a patient, another working device or any other reference that that can be used to determine whether this part of the second predetermined criteria can be used to establish the identified device as coming within a relational region designated for the temporary work group. If the relative location of the device is determined to be outside the relational region, the device fails to meet the second predetermined criteria, and the operation returns to block 408 to check for additional devices.

If, on the other hand, the relative location is within the relational region at block 416, the functionality of the device is determined at block 420 as another part of the second predetermined criteria. If the functionality of the device does not meet the functionality indicated as needed for the temporary work group, the device fails to meet the second predetermined criteria, and the operation returns to block 408. Alternatively, if the functionality of the device does meet the functionality indicated as needed for the temporary work group, the working device 300 is attached to the AP 104 at block 422. In addition, at block 424 as part of the association of the working device with the temporary work group, the device may be selectively configured for operation in the temporary work group, if such configuration of the working device 300 is warranted. In other examples, other criteria may be included in the second predetermined criteria.

At block 426 it is determined if there are any working devices, such as sensors 114, which are linked with the working device forming a sub-association. If there is a sub-association, the linked working devices or other devices, such as sensor, are also associated with the temporary work group by being attached to the AP 104 and configured (if warranted) at block 428 and the operation then returns to block 408 to determine if there are additional devices needed for the temporary working group which have not yet been communicated with. Also, if at block 426, it is determined that the working device 108 does not have any sub-associations, the operation proceeds directly to block 408.

If, at block 408, it is determined that no additional working devices are needed for the temporary work group, the operation proceeds to block 432 to determine if there are any devices not associated with temporary working group which are communicating in the reserved frequency spectrum. If yes, at block 434 any such devices are moved, such as by changing the AP 104 being used by the device for communicates, so the device communicates in a different frequency spectrum outside the reserved bandwidth, and the operation proceeds to block 436 to operate the working devices within the temporary work group. If, at block 432 there are no un-associated devices communicating in the reserved bandwidth, the operation can proceed directly to operation at block 436.

During operation, at block 438, it may be determined whether the temporary work group is still in use or has otherwise has reason to be dissolved. If the temporary work group should no longer be maintained, and is ready for dissolution, all the working devices in the temporary work group may be de-authorized and dis-associated at block 440. In addition, at block 442, the reservation may be withdrawn thereby making both the AP 104 and the bandwidth frequency spectrum available for other uses within the network.

If, at block 438 the temporary work group is still operational and the temporary work group should be maintained in existence, the operation proceeds to block 444 to determine if the working devices 300 associated with the temporary work group still meet both the first predetermined criteria and the second predetermined criteria and should be retained in the temporary work group. If yes, the operation returns to block 436. If any one or more of the working devices 300 associated with the temporary work group no longer meet both the first predetermined criteria and the second predetermined criteria, those devices may be de-authorized from participation in the temporary work group, and may be disassociated from the temporary work group at block 446. In addition, the operation may return to block 404 to communication with other devices in order to identify one or more replacement working devices for association with the temporary work group. In other example operations, replacement working devices may be identified and associated prior to de-authorization and disassociation of the previously associated working device(s) to allow dynamic replacement of working devices without disruption of operation of the temporary work group. Accordingly, state data and other information may be transferred from the previously associated working device to the newly associated working device to enable seamless transfer without significant interruption of the process or other activity, which is the mission or topic performed by the temporary work group due to the addition of the new working device(s).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium which is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or stored in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

We claim:
1. A method comprising:
    allocating an access point in a network to provide network access to a temporary work group;
    selectively identifying, with a network device, a plurality of working devices as being available for inclusion in the temporary work group based on a first predetermined criteria comprising proximity to the access point and authentication of each of the working devices;
    associating, with the network device, selected working devices within the plurality of working devices with the temporary work group based on a second predetermined criteria comprising a respective relative location of the working devices and respective functionality of the working devices;

attaching the working devices associated with the temporary work group to the access point with a predetermined protocol to form a work group session; and preempting other than the selected working devices from association with the work group session until the other than the selected devices meet both the first predetermined criteria and the second predetermined criteria.

2. The method of claim 1, wherein associating selected working devices within the plurality of working devices with the workgroup comprises selectively configuring at least some of the selected working devices for communication within the work group session prior to attachment.

3. The method of claim 1, wherein preempting comprises reserving a range of frequency spectrum exclusively for communication by the temporary work group and moving the other than the selected working devices to a different range of frequency spectrum.

4. The method of claim 1, wherein associating selected working devices within the plurality of working devices with the work group comprises confirming communication latency between the access point and the selected working devices is below a predetermined threshold.

5. The method of claim 1, wherein allocating the access point comprises confirming the capability of the access point to provide communication below a predetermined latency threshold.

6. The method of claim 1, wherein the first predetermined criteria comprises a determination that a signal strength of communication between the access point and the plurality of working devices is above a predetermined threshold.

7. The method of claim 1, wherein the predetermined protocol is an attachment protocol, and attaching the devices comprises creating a secure connection path to each working device in the work group session.

8. The method of claim 1, wherein attaching the working devices associated with the temporary work group to the access point with the predetermined protocol comprises generating encryption keys for the work group session and encrypting data being communicated using the encryption keys.

9. The method of claim 1, further comprising communicating data from at least some of the working devices associated with the work group session to a cloud based resource located in the network via the access point, and receiving from the cloud based resource via the access point analysis of the communicated data.

10. The method of claim 1, further comprising indicating from working devices that they are in communication over the network via the allocated access point and participating in the work group session.

11. The method of claim 1, wherein the network device includes the access point.

12. A system comprising:
a network device configured to provide network access to a temporary work group;
the network device comprising device circuitry configured to identify a plurality of working devices as eligible for inclusion in the temporary work group based on a first predetermined criteria, the first predetermined criteria comprising proximity to access point circuitry and authentication of each of the plurality of working devices;
the device circuitry further configured to associate selected working devices within the plurality of working devices with the temporary work group based on a second predetermined criteria, the second predetermined criteria comprising a respective relative location of the working devices and respective functionality of the working devices; and
the network device further configured to form a work group session by connection of the associated working devices using a predetermined protocol, and preempt non-selected working devices from establishment of a connection until compliance with the first predetermined criteria and the second predetermined criteria is confirmed.

13. The system of claim 12, wherein at least one of the working devices associated with the work group session are sub-associated with another device, the another device being dynamically and automatically associated with the temporary work group due to being sub-associated.

14. The system of claim 12, wherein the device circuitry is further configured to re-arrange the working devices associated with the working group session by dynamic and automatic replacement of a first working device associated with the temporary work group by a second working device due to changes in at least one of the first predetermined criteria and the second predetermined criteria with respect to the first and second working devices, the second working device comprising the respective functionality of the first working device.

15. The system of claim 12, wherein the network device comprises the access point circuitry, which provides communication over a wireless network to at least some of the plurality of working devices.

16. The system of claim 12, wherein the temporary work group is a temporary work group of connectivity and the network device includes at least one access point, which provides network access to only those selected working devices associated with the temporary work group of connectivity.

17. The system of claim 12, wherein the geographic location is a physical location, and a geo-location of each of the working devices in the workgroup session is a three-dimensional location used to determine the relative location with respect to a reference point in communication with the temporary work group, the geo-location and the relative location being determined independently from the geographic location.

18. The system of claim 12, wherein the temporary work group is associated with a patient in a medical facility, and the working devices in the work group session comprise medical equipment.

19. A system comprising:
a network device configured to dynamically and automatically associate a plurality of working devices with a temporary work group based on each of the plurality of working devices meeting a first predetermined criteria and a second predetermined criteria,
wherein the first predetermined criteria comprises successful authentication of each of the working devices, and a respective geographic proximity of the working devices being met; and the second predetermined criteria comprises a relative location in three dimensional space of each of the working devices being in a relational region with respect to a reference point, and a functionality of each of the working devices being eligible for a mission of the temporary work group; and
access point circuitry configured to connect each of the associated working devices in a working group session using a predetermined protocol, and preempt non-selected working devices from establishment of a connection until the first predetermined criteria and the second predetermined criteria are met, and the non-selected working devices are determined as eligible for the mission of the temporary work group.

20. The system of claim 19, wherein the network device is further configured to dynamically adjust a membership of the working devices associated with the temporary working group to include an additional working device in the work group session, in response to a sub-association of the additional working device with a working device being associated with the temporary work group.

* * * * *